United States Patent
Diven et al.

[11] Patent Number: 6,124,901
[45] Date of Patent: Sep. 26, 2000

[54] CATHODE-RAY TUBE MOUNTING WITHIN A CABINET

[75] Inventors: Gary Lee Diven; Bruce George Marks; Jonathan Bradford Fowler, all of Lancaster, Pa.

[73] Assignee: Thomson Licensing S.A., Boulogne Cedex, France

[21] Appl. No.: 08/829,517

[22] Filed: Mar. 28, 1997

[51] Int. Cl.[7] .................................................. H04N 5/65
[52] U.S. Cl. ...................... 348/822; 348/825; 348/836
[58] Field of Search ............................. 348/836–843, 348/805, 818, 821–826; H04N 5/65

[56] References Cited

U.S. PATENT DOCUMENTS

| | | | |
|---|---|---|---|
| 3,283,072 | 11/1966 | Pestka et al. | 178/7.9 |
| 3,417,201 | 12/1968 | Joseph et al. | 178/7.82 |
| 4,295,574 | 10/1981 | Nakazima et al. | 220/2.1 A |
| 4,360,838 | 11/1982 | Babicz et al. | 358/248 |
| 4,641,196 | 2/1987 | Musha et al. | 358/246 |
| 4,643,493 | 2/1987 | Sides, Sr. et al. | 312/7.2 |
| 4,858,016 | 8/1989 | Suehiro et al. | 358/246 |
| 5,057,929 | 10/1991 | Hermann | 358/246 |

FOREIGN PATENT DOCUMENTS

| | | |
|---|---|---|
| 2637950A | 4/1990 | France . |
| 01 284180A | 11/1989 | Japan . |
| 04 087482A | 3/1992 | Japan . |
| 04 332278A | 11/1992 | Japan ................ H04N 5/645 |
| 05 328262A | 12/1993 | Japan ................ H04N 5/64 |
| WO97/09825 | 3/1997 | WIPO . |

OTHER PUBLICATIONS

*Patent Abstracts of Japan, vol. 014, No. 065 (E–0884), Feb. 6, 1990 (Nippon Chemicon Corp.).
**Patent Abstracts of Japan, vol. 016, No. 312, (E–1230), Jul. 9, 1992 (Kikusui Denshi Kougiyou KK).
***Patent Abstracts of Japan, vol. 017, No. 178 (E–1347), Apr. 7, 1993 (Mitsubishi Electric Corp.).
****Patent Abstracts of Japan, vol. 018, No. 152 (E–1523), Mar. 14, 1994 (Matsushita Electric Ind. Co. Ltd.).
PCT Search Report dated: Jun. 16, 1998.

*Primary Examiner*—Young Lee
*Attorney, Agent, or Firm*—Joseph S. Tripoli; Dennis H. Irlbeck

[57] ABSTRACT

The present invention provides an improvement in the mounting of a cathode-ray tube within a cabinet. The cathode-ray tube includes a glass envelope having a faceplate panel, a funnel and a neck. The panel includes a faceplate that is surrounded by a peripheral sidewall. A tension band encircles the outer periphery of the sidewall. The cabinet has resilient extensions from the interior thereof, that engage a portion of the tension band and support the tube within the cabinet.

2 Claims, 3 Drawing Sheets

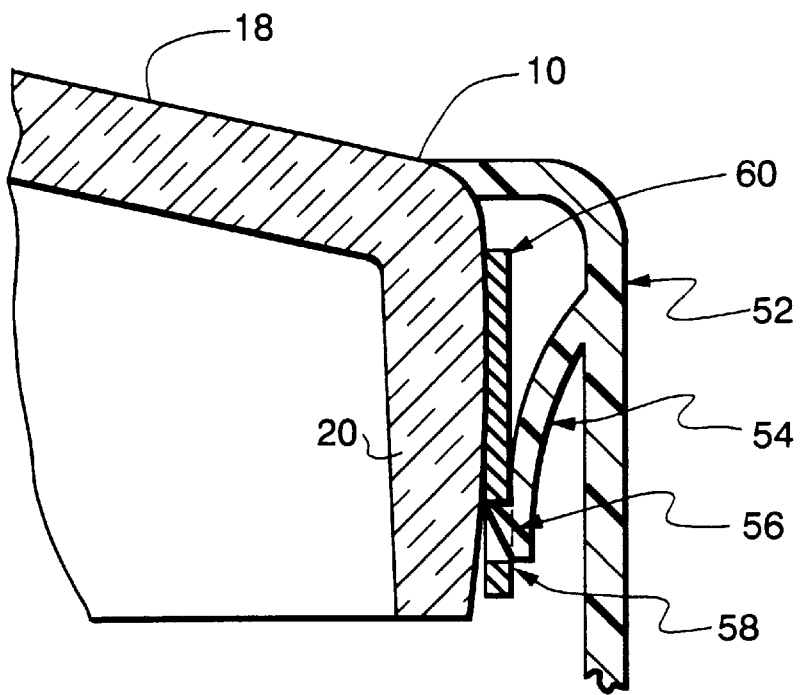
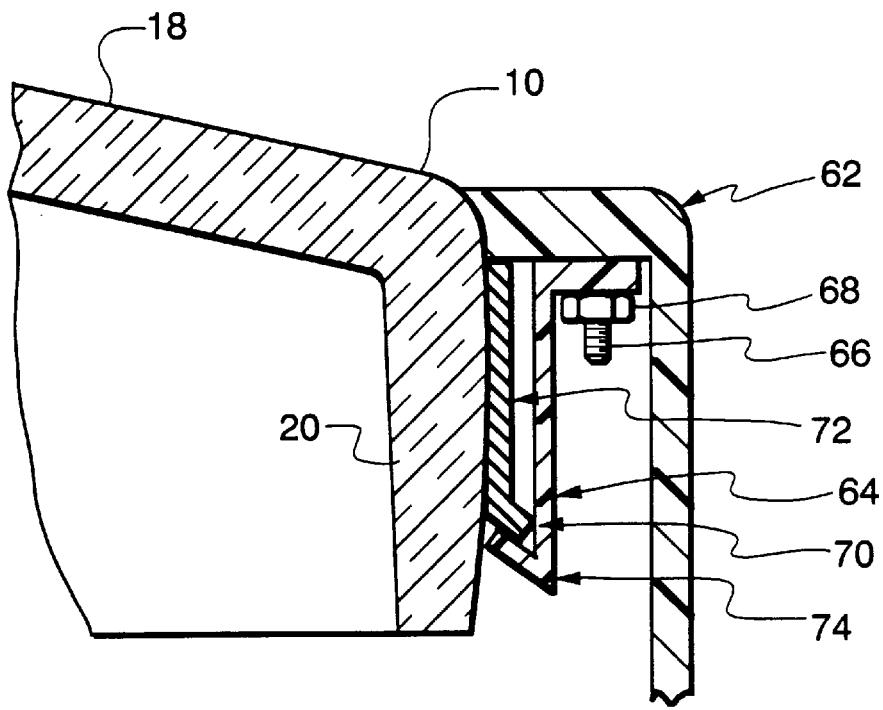

CATHODE-RAY TUBE MOUNTING WITHIN A CABINET

This invention relates to mounting a cathode-ray tube within a cabinet and, particularly, to such a mounting means that can permit a reduction in the width of a cabinet.

BACKGROUND OF THE INVENTION

A cathode-ray tube, such as a color picture tube, has a glass envelope that comprises a neck, a funnel and a faceplate panel. The faceplate panel includes a viewing faceplate that is surrounded by a peripheral sidewall. When a cathode-ray tube is evacuated to a very low internal pressure, it is subjected to the possibility of implosion caused by the stresses produced on the tube envelope by atmospheric pressure. In order to reduce the possibility of implosion, as well as to reduce the effects of an implosion, should it occur, a tension band usually is applied externally to the panel sidewall. Such tension band applies compressive forces to the sidewall which redistribute the stresses in the panel.

As known in the art, mounting lugs, integral with, attached to, or disposed between the band and the tube sidewall, are used to support the tube within a cabinet. Typically, the mounting lugs are positioned at the corners of the tube. However, set designers have found this mounting technique to be somewhat undesirable, because the internal size of a cabinet must accommodate the tube plus the mounting lugs, which adds from about 5 to 9 cm to the overall diagonal dimension of the tube. Set designers have expressed a desire for a mounting technique that would decrease the dimension of the mounting means, so that a trimmer visual appearance could be achieved. The present invention provides mounting means which permits a substantial reduction in the width of the cabinet.

SUMMARY OF THE INVENTION

The present invention provides an improvement in the mounting of a cathode-ray tube within a cabinet. The cathode-ray tube includes a glass envelope comprising a faceplate panel, a funnel and a neck. The panel includes a faceplate that is surrounded by a peripheral sidewall. A tension band encircles the outer periphery of the sidewall. The improvement comprises the cabinet having resilient means, extending from the interior thereof, that engage a portion of the tension band and support the tube within the cabinet.

BRIEF DESCRIPTION OF THE DRAWINGS

FIG. 4 is a side view, partly in axial section, of a corner section of a cathode-ray tube mounted within a cabinet by a second mounting means embodiment in accordance with the present invention.

FIG. 5 is a side view, partly in axial section, of a corner section of a cathode-ray tube mounted within a cabinet by a third mounting means embodiment in accordance with the present invention.

DETAILED DESCRIPTION OF THE PREFERRED EMBODIMENTS

Figure 1:
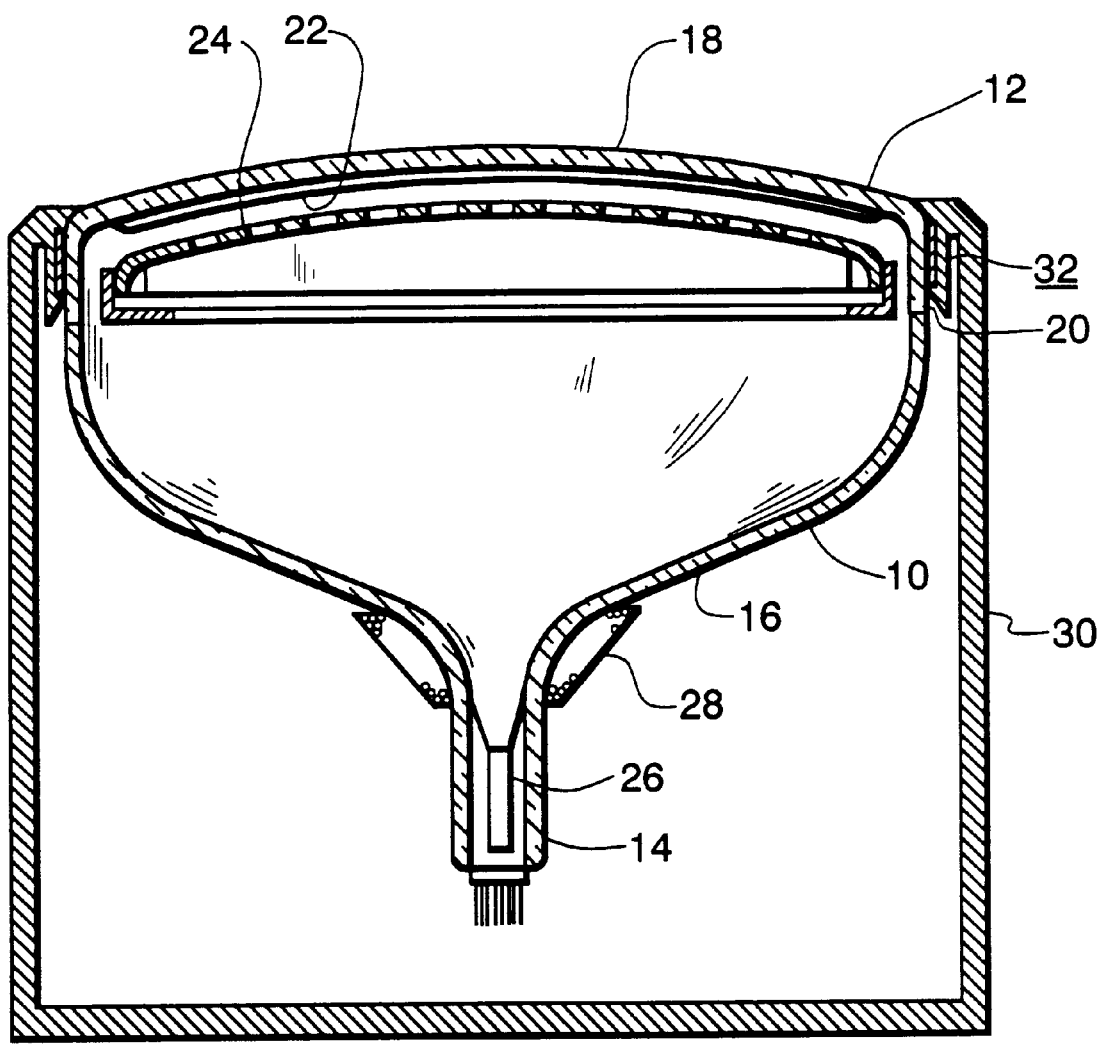
FIG. 1 is a side view, partly in axial section, of a color cathode-ray tube mounted within a cabinet.

FIG. 1 shows a rectangular color cathode-ray tube 10 having a glass bulb or envelope comprising a rectangular faceplate panel 12 and a tubular neck 14 connected by a rectangular funnel 16. The panel 12 comprises a transparent rectangular viewing faceplate 18, and a peripheral flange or sidewall 20 which is sealed to the funnel 15. A three-color phosphor screen 22 is carried by the inner surface of the faceplate 18. A multi-apertured color selection electrode or shadow mask 24 is removably mounted in predetermined spaced relation to the screen 22. An electron gun 26 is centrally mounted within the neck 14, to generate and direct three electron beams along convergent paths through the mask 24 to the screen 22. The electron beams are deflected in a rectangular raster by a deflection yoke 28 that is located at the junction of the neck 14 and funnel 16. The tube 10 is shown mounted within a cabinet 30 by improved mounting means 32 to be discussed below.

Figure 2:
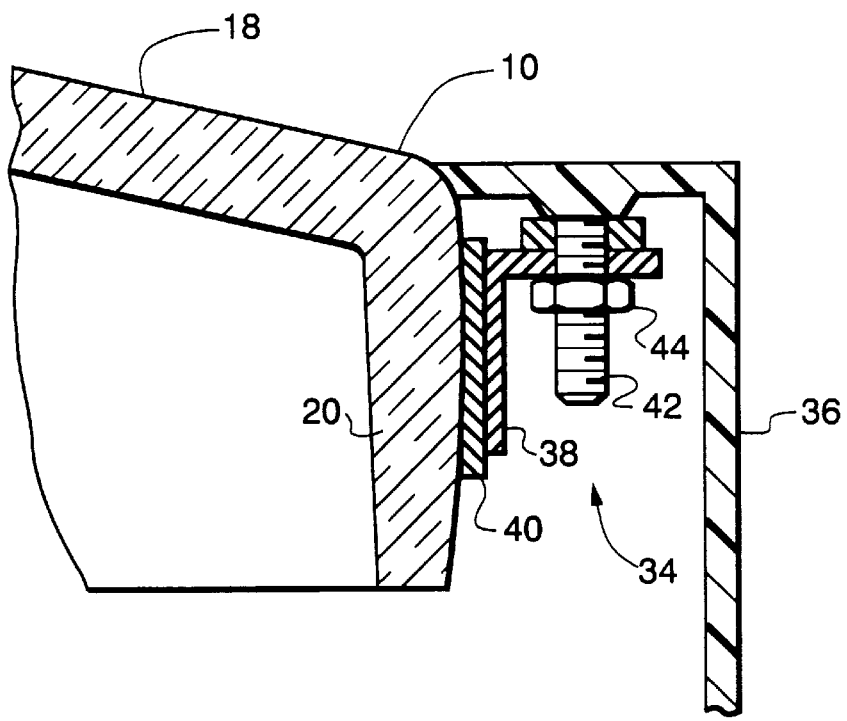
FIG. 2 is a side view, partly in axial section, of a corner section of a cathode-ray tube mounted within a cabinet by a prior art mounting means.

A prior art mounting means 34, for connecting a tube 10 within a cabinet 36, is shown in FIG. 2. The mounting means 34 includes four lugs 38, one of which is shown, that are welded to a tension band 40 at the four corners of the tube. Each lug 38 includes an aperture therein for receiving a bolt 42 that is attached to the cabinet 36. A nut 44 on the bolt 42 holds the lug 38 securely within the cabinet 36.

Figure 3:
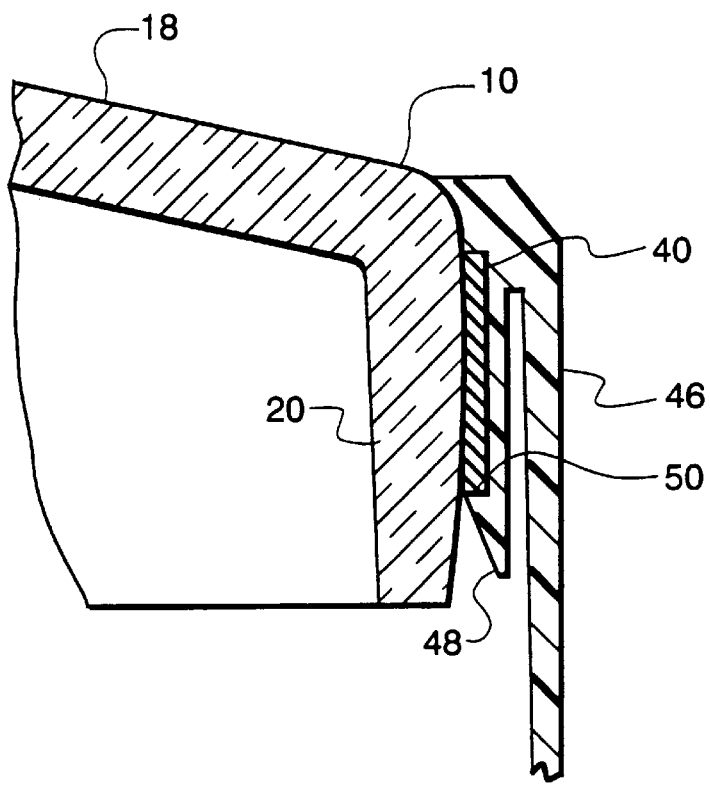
FIG. 3 is a side view, partly in axial section, of a corner section of a cathode-ray tube mounted within a cabinet by a first mounting means embodiment in accordance with the present invention.

In the embodiments of the present invention, no lugs are used. Instead, a tube is held within a cabinet by means that lock onto the tension band on the tube. In a first preferred embodiment, shown in FIG. 3, each corner of a cabinet 46 includes an interior flexible arm 48 that extends against the tension band 40 on the tube 10. A step 50 near an end of the arm 48 engages an edge of the tension band 40. In this embodiment, the tube 10 can be inserted into the cabinet, through the rear thereof, until the flexible arms 48, at the four corners of the tube, snap over the tension band 40, thus engaging the band and holding the tube within the cabinet.

In a second embodiment, shown in FIG. 4, each corner of a cabinet 52 includes an integral interior flexible arm 54 that has a stepped portion 56 near its distal end. The stepped portion 56 engages an aperture 58 in a tension band 60 on the tube 10. In this second embodiment, the stepped portions 56 of the arms 54, at the four front corners of the cabinet 52, snap into the apertures 58 when the tube 10 is inserted through the rear of the cabinet.

In a third embodiment, shown in FIG. 5, each corner of a cabinet 62 includes a flexible arm 64 that is attached to the interior of the cabinet by a bolt 66 and nut 68. In this embodiment, an end 70 of a tension band 72 is bent up to receive a stepped or hooked end 74 of the flexible arm 64. For this third embodiment, it may be more convenient to first insert the tube into the cabinet and then attach the flexible arms 64 in engagement with the band 72.

The scope of the present invention includes various combinations of features described with respect to the three preferred embodiments. In each variation, however, there is resilient means, such as a flexible arm, extending from a cabinet, that engages some portion of a tension band.

What is claimed is:

1. A cathode-ray tube including a glass envelope comprising a faceplate panel, a funnel and a neck, said faceplate panel including a rectangular viewing faceplate and a peripheral sidewall and having four corners, said tube including a tension band surrounding said sidewall, and said tension band having apertures at the four corners of said faceplate panel for snapping onto a stepped portion of an integral flexible arm extending from the interior of a cabinet to facilitate mounting of said tube within the cabinet.

2. A cathode-ray tube including a glass envelope comprising a faceplate panel, a funnel, and a neck, said faceplate panel including a rectangular viewing faceplate and a peripheral sidewall and having four corners, said tube including a tension band surrounding said sidewall, and said tension band having apertures at the four corners of said faceplate panel for snapping onto stepped portions of integral flexible extensions from the interior of a cabinet to facilitate mounting of said tube within the cabinet.

* * * * *